(12) United States Patent
Ullmann

(10) Patent No.: US 6,763,355 B2
(45) Date of Patent: Jul. 13, 2004

(54) METHOD AND APPARATUS IN MARK-UP LANGUAGE DOCUMENTS FOR PROVIDING MARK-UP LANGUAGE HIDDEN ATTRIBUTES

(75) Inventor: Lorin Evan Ullmann, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 09/740,217

(22) Filed: Dec. 18, 2000

(65) Prior Publication Data

US 2002/0078051 A1 Jun. 20, 2002

(51) Int. Cl.[7] ............................ G06F 17/30; G06F 7/00; G06F 15/16
(52) U.S. Cl. .............................. 707/10; 707/3; 709/229
(58) Field of Search .................... 707/10, 3, 9; 709/229

(56) References Cited

U.S. PATENT DOCUMENTS

| | | | |
|---|---|---|---|
| 4,890,098 A | 12/1989 | Dawes et al. | 340/721 |
| 5,659,729 A | 8/1997 | Nielson | 395/603 |
| 5,708,709 A * | 1/1998 | Rose | 380/4 |
| 5,742,768 A | 4/1998 | Gennaro et al. | 295/200.33 |
| 5,978,847 A | 11/1999 | Kisor et al. | 709/227 |
| 6,009,441 A | 12/1999 | Mathieu et al. | 707/516 |
| 6,021,416 A | 2/2000 | Dauerer et al. | 707/501 |
| 6,031,530 A | 2/2000 | Trueblood | 345/342 |
| 6,112,242 A | 8/2000 | Jois et al. | 709/225 |
| 6,122,657 A | 9/2000 | Hoffman, Jr. et al. | 709/201 |
| 6,138,237 A * | 10/2000 | Ruben et al. | 713/200 |
| 6,311,214 B1 * | 10/2001 | Rhoads | 709/217 |
| 6,442,549 B1 * | 8/2002 | Schneider | 707/10 |
| 6,446,192 B1 * | 9/2002 | Narasimhan et al. | 712/29 |
| 2002/0026321 A1 * | 2/2002 | Faris et al. | 705/1 |

* cited by examiner

Primary Examiner—Wayne Amsbury
Assistant Examiner—Cindy Nguyen
(74) Attorney, Agent, or Firm—Jeffrey S. LaBaw; Anne V. Dougherty

(57) ABSTRACT

A system and method for providing at least one hidden markup attribute to convey additional information to target recipients. At least one hidden markup attribute is included in a communication from a server. When a browser at a client/user location receives the communication with the at least one hidden markup attribute, the browser will be able to decode the hidden markup attribute portion of the markup only if it has a correct render key. The render key may be predefined and exchanged between the server and the client. Alternatively, the render key may be communicated to the client with the hidden markup attribute communication. The latter scenario is useful when a server must dynamically calculate the render key based upon the client's capabilities (e.g., discovered during the establishment of communication between the entities). A server may alternatively have a generic default render key for all users.

20 Claims, 5 Drawing Sheets

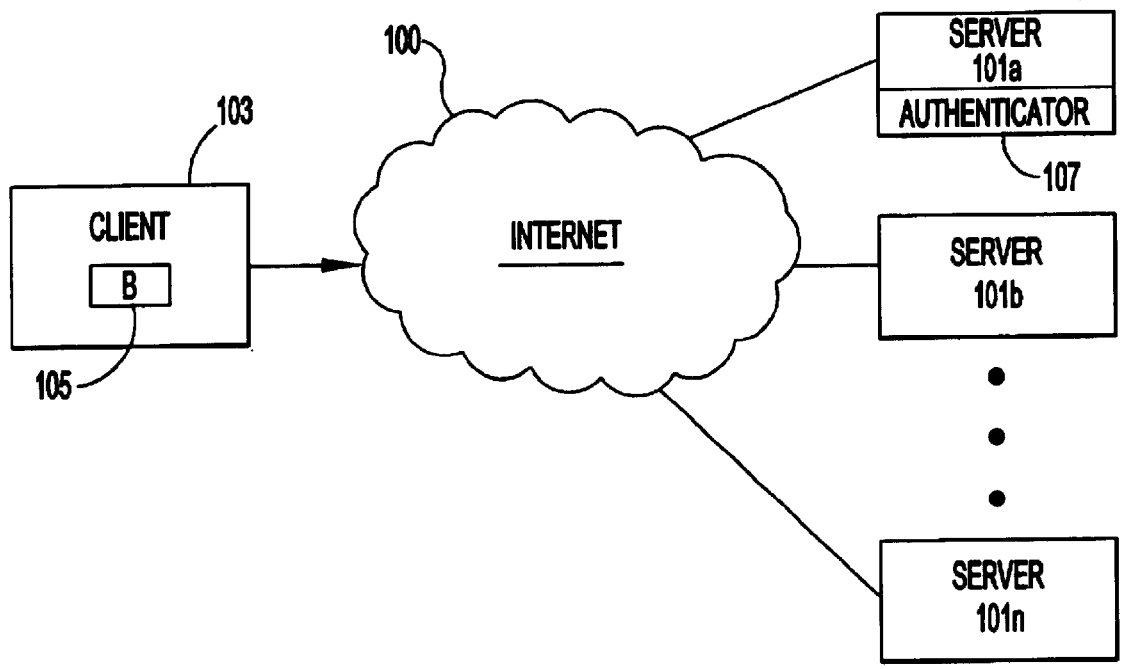
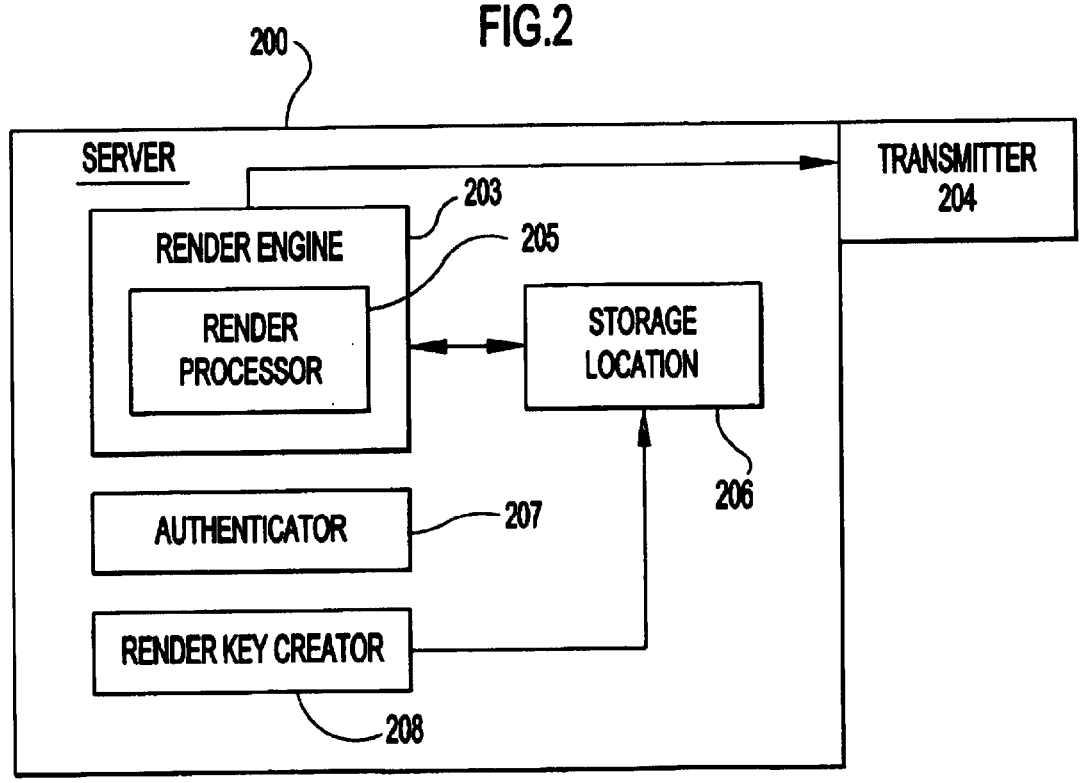

500

501

503

HMA BROWSER USER PREFENCES GUI (TO BE USED WHEN CREATING/EXCHANGING FONT KEY)

NUMBER OF CHARACTERS TO BE USED IN FONT KEY ENCODING
(SIMILAR TO NUMBER OF BITS DECODED IN SSL, HOW STRONGLY YOU SECURE THE DATA)

20
40
60

INCLUDE INVISIBLE CODE POINTS FROM FOLLOWING COUNTRIES

ALL
ASIAN
EUROPEAN
ETC.

NEED EXAMPLE OF CONTENT DISPLAY TO EACH TYPE OF USER:

ORDINARY USER:
    ACCOUNT BALANCE=

SUPER USER OR ADMIN. OR THE USER WHO IS THE OWNER OF THE ACCT.
    ACCOUNT BALANCE= $124

FIG.7

METHOD AND APPARATUS IN MARK-UP LANGUAGE DOCUMENTS FOR PROVIDING MARK-UP LANGUAGE HIDDEN ATTRIBUTES

FIELD OF THE INVENTION

This invention relates to distributed network communications and more particularly to using hidden markup attributes to communicate information to selected recipients of markup language documents.

BACKGROUND OF THE INVENTION

Mark-up languages, such as Hyper-text Mark-up Language (HTML), Standard Generalized Mark-up Language (SGML), Virtual Reality Modeling Language (VRML), etc., are used throughout the electronic communications industry as languages in which to transmit communications over the Internet. A browser running at a receiving computer will receive the communication in the markup language and then convert the content for display to a user.

It is desirable, and often necessary, to incorporate information in the communication in addition to the content to be displayed. Addressing information in necessarily included; but, communications may also include user authentication certificates (e.g., Socket Security Layer or SSL), security hash algorithms for encoding or decoding the content data, and the like.

Communications would also preferably include such information as "instructions" for use by the web browser (e.g., designating what content to display). U.S. Pat. No. 6,009,441 provides a system and method for incorporating a token which is used to tell the web page editor whether or not to display certain accompanying data. Another approach is taught by U.S. Pat. No. 6,021,416, which provides automatic processing of a markup language tags for the purpose of displaying data to a user's browser. Another U.S. Pat. No. 5,659,729 introduces an approach that, if there is user-specific additional information available, an additional fetch step is required for retrieval of that information.

It may also be desirable to have other information included in a communication, such as information for use by an administrator or a web content developer/designer to instruct the browser to hide sensitive data from some users or even to hide some non-sensitive received data from the user while implementing that received data (e.g., code to set links related to the data requested and displayed to the user). Yet another use of accompanying information would be to secure data for a general purpose authorization subsystem, to be used to exchange data between two users. Further, such additional information may be used to tailor a communication to a particular user machine (e.g., in the case of a traveling user who communicates from an office PC generally but uses a PDA while in transit) or to a particular user location (e.g., render a communication in English while the user is in the U.S., but in Spanish when the user is communicating from a machine in South America).

What is desirable, therefore, and what is an object of the present invention is to provide a system and method for including hidden markup language attributes to convey more information about browser handling of web content.

Yet another object of the invention is to provide the hidden markup language attributes in such a way as to be overlooked by non-intended users and/or browses.

Still another object of the invention is to provide the mechanism needed to decode hidden language attributes based on a user machine's current locale configuration.

Another object of the invention is to provide the mechanism needed to decode hidden language attributes based on a user machine's current font subsystem's configuration with regard to displaying locale specific textual information.

Yet another object of the invention is to provide the mechanism needed to decode hidden language attributes based on a user machine's current language configuration together with the markup content sent in a single step to the user's browser.

SUMMARY OF THE INVENTION

The foregoing and other objects are realized by the present invention which includes a system and method for providing at least one hidden markup language attribute to convey additional information to target recipients. Under the present invention, at least one hidden markup language attribute is included in a communication from a server. When a browser at a client/user location receives the communication with the at least one hidden markup language attribute, the browser will be able to decode the hidden markup language attribute portion of the markup only if it has a correct render key. The render key may be predefined and exchanged between the server and the client, with the key residing at the client. Alternatively, the render key may be dynamically created by the server and communicated to the client together with the hidden markup language attribute communication or in a separate communication. The latter scenario is useful when a server must dynamically calculate the render key based upon the client's capabilities (e.g., discovered during the establishment of communication between the entities). A server may alternatively use a generic default render key for all users to make use of select hidden markup language attributes.

BRIEF DESCRIPTION OF THE DRAWINGS

The invention will now be described in greater detail with specific reference to the appended drawings wherein:

FIG. 1 provides a schematic diagram of a network in which the present invention can be implemented;

FIG. 2 provides a schematic diagram of a server including components of the network server entity for implementing the present invention;

FIG. 5 provides a representative graphical user interface for use in creating a render key for a user;

FIG. 7 provides a graphical representation of the display of a web-based banking service for different users.

DESCRIPTION OF THE PREFERRED EMBODIMENT

Figure 3:
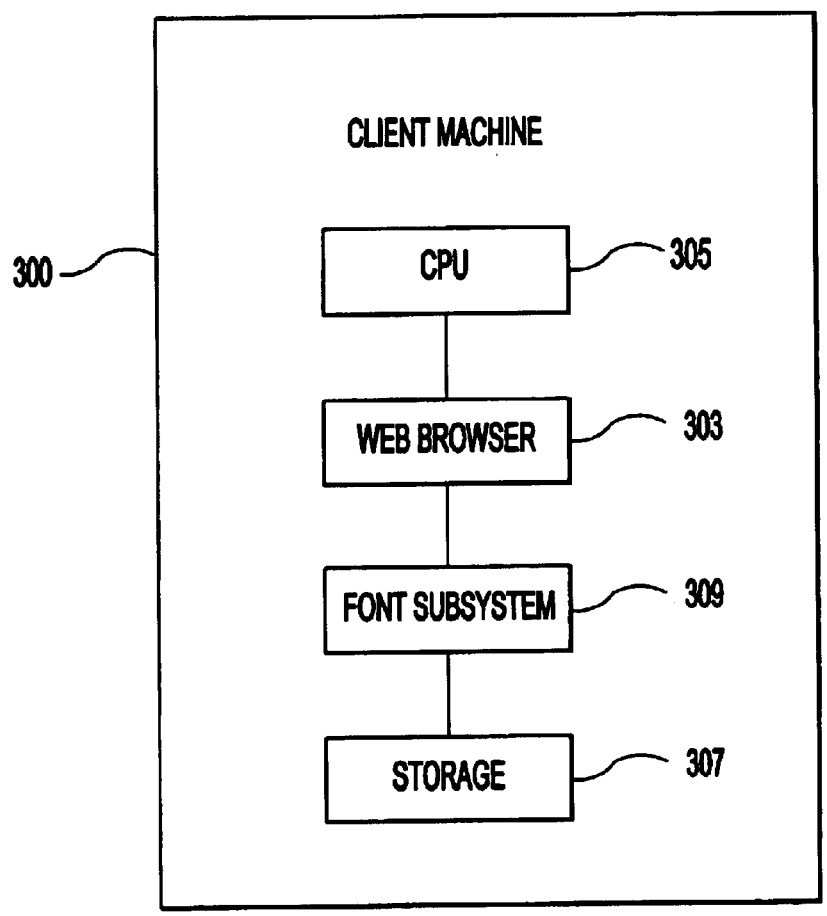
FIG. 3 provides a schematic diagram of a client in accordance with the present invention.

The present invention can be implemented in any network with at least one server and at least one client. FIG. 1 illustrates a typical network having a plurality of servers 101a–101n with which a client 103 can establish communications across the Internet 100. In accordance with prior art communications across the Internet, a client 103 would establish communications with a server, for example 101a, and make a request for information from that server. For "general purpose" web sites which are available to all users, the server would simple provide the response in a markup language and send the communication to the client. A web browser 105 at the client location 103 would convert the markup language document into a format which could be displayed to the user. Commonly, if the client machine is not capable of displaying the data, the display will include a plurality of non-readable characters (e.g., rectangular boxes) in the place of non-displayable content. Alternatively, a user at the client machine may receive a message indicating that the requested page "cannot be displayed."

For web sites which provide information on a restricted basis, for example only to paying subscribers, some authentication mechanism is additionally incorporated into the communications between the two entities. For example, the server may request that the user provide a predefined password, or the client request may automatically include a password or other authentication indicia for verification at the server. The authenticator component 107 at server 101a would perform the client/user authentication prior to responding to the request to send information. Nonetheless, even with authenticated communications, some of the content may not be displayable at the client.

Further, in addition to the need to provide primary content which is displayable, it may be desirable to provide more information to a particular client to not only allow display of the primary content but to also allow browser handling of additional content. While prior art methods could authenticate a user and then effectively instruct the user's browser whether or not to display content, no existing mechanism could teach a browser how to handle and how to display content for a particular user.

In accordance with the present invention, hidden markup language attributes (hereinafter also referred to as "hidden markup attributes" and "hmas") are incorporated into server communications, which hidden markup language attributes will be ignored by legacy browsers and will be discerned and used by browsers having a render key to decode the hidden markup attributes. The render key is executable code which allows the client browser to decode hidden markup language attributes included in server communications in order to display or otherwise handle the content thereof. The hidden markup language attribute may include, but is not limited to, the user ID, a password, font properties for JVM (for example, if Java is used) or new JVM font code if such is required to display the data, and the operating system (OS) codepage for the user.

FIG. 2 provides a schematic diagram of a network server entity for implementing the present invention. The server 200 comprises a Hyper-Text Transfer Protocol (HTTP) engine 203, and storage 206 for storing primary server content as well as such information as users' unique IDs for use by the authenticator 207, etc. The storage will also be available to store any render key which is either created by the server, at the font key creator 208 or exchanged between the client and the server. The server 200 also includes a Render Processor 205 for incorporating hidden markup attributes into server communications. The render processor 205 will determine what content should be provided and in what form for a particular user, based on the render key associated with that user. The render processor will then include hidden markup attributes as part of the communication, if necessary, as detailed below with reference to the process flow of FIG. 6. Communications from the server will be transmitted from transmitted 204 in accordance with the known prior art.

FIG. 3 provides a schematic diagram of a client in accordance with the present invention. On the client side, the client user machine 300 includes a Web browser 303, at least one storage location 307 for storing the client render key (among other information such as the unique ID), and at least one processor 305. The client location may, as noted above, be a PC such as a laptop or a less sophisticated device such as a Personal Data Assistant (PDA) with far less capability for processing and display. The client location will typically include at least one subsystem for use by both the browser and the processor when display is desired. The illustrated subsystem 309 is a Java Virtual Machine (JVM) Font Subsystem which, in response to receipt of a communication having hidden markup attributes indicating special font display, would be updated by the browser using a render key to allow display of the content which is to be displayed. It is to be noted that the hidden markup attributes and render key could also be used to update audio or video subsystems for enhanced display of primary content.

Figure 4:
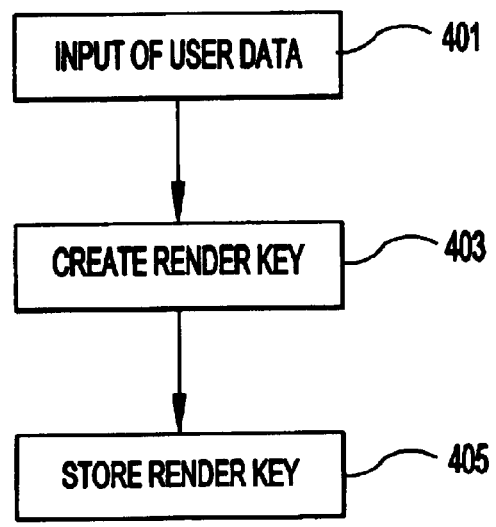
FIG. 4 provides a representative process flow for one creating a render key in accordance with one aspect of the invention.

FIG. 4 provides a representative process flow for the creation of render keys in accordance with one aspect of the invention. When a user signs up for a web-based service, such as on-line banking, the user must pre-register by inputting personal and financial information as well as by inputting some unique user indicia at 401 (i.e., user ID and passcode) to serve as authentication information. The present invention extends the registration process to include the creation of a render key for the user at 403. The creation of the render key may be a "passive" action whereby the server discovers the capabilities of the client machine from which the user is communicating, creates the render key, and associates that information to the user ID information; or, it may be an active exchange of information, including, but not limited to, user input of preferences for rendering language, rendering font, etc. The render key may be wholly created at the client site and simply passed to the server, or may be created at the server based on passively or actively discovered user and client machine data. The render key may simply include pointers to client-resident rendering capabilities or may include the actual software necessary to convert data at the client location into the user-preferred display (e.g., to convert from Arabic to Kanji characters). Once the key is created and associated with the user, the key is stored at 405 in storage locations at both the client and the server. As noted above, there may be a generic default render key which will be associated with all users regardless of the capabilities of the machine from which a particular user is communicating. Such a generic default render key is stored at the server at storage location 206 for use when creating and communicating any document having hidden markup language attributes when a client-specific render key is not available.

FIG. 5 provides a representative graphical user interface display 500 for use in creating a render key for a user. A user at the client machine will be prompted by the render key creator 208 at the server, or by a corresponding render key creator at the client location (not shown) to enter user preference information such as the number of characters (at 501) to be used in for rendering a display, the invisible code points (at 503) for selected countries, a unique identifier such as a unique IP Address or CPU ID for a machine whereby data could only be viewed using that identifier, etc.

Figure 6:
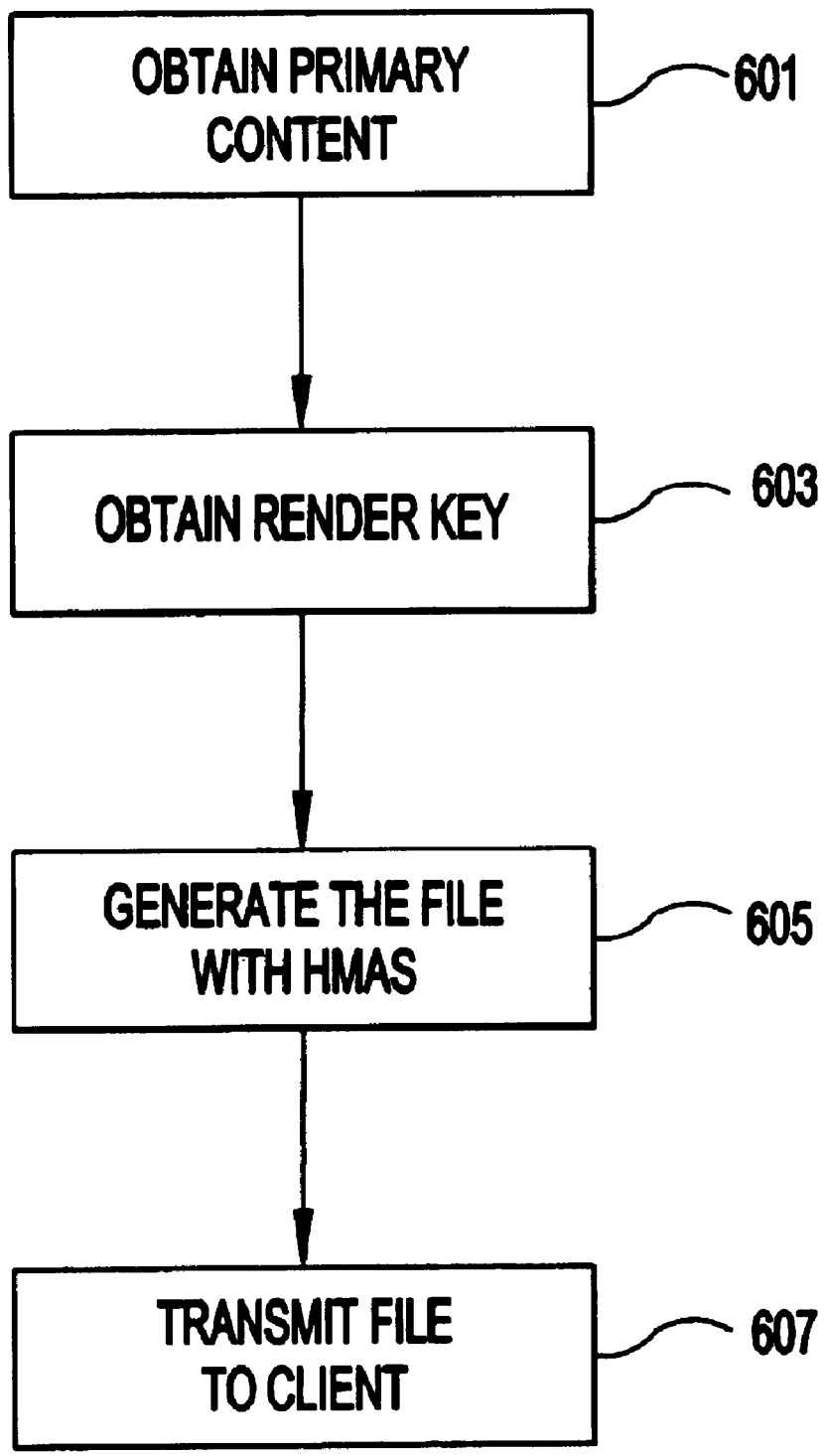
FIG. 6 provides a representative process flow for utilization of a render key in accordance with the present invention.

FIG. 6 provides a representative process flow for utilization of a render key in accordance with the present invention. When a document is requested from a server, the server first accesses its storage at step 601 to obtain the primary content which has been stored in the original form provided by the content editor. That primary content will not be provided in its stored form to the client, however, but will be incorporated into a file containing both primary content and at least one hidden markup attribute by the render processor. At step 603, therefore, the render processor obtains a render key for converting the stored content in to a file with at least one hidden markup attribute.

The step of obtaining the render key may take one of several forms. The render key may be included in the client request, in which case the server simply extracts the render key from the request after authentication is completed. If the client request does not include the full render key, which can be a fairly large amount of data to be exchanging, the server may access its storage location to find the stored render key which is associated with the requesting client. If no render key has been received or stored for the client, the server can do one of two things: create a client-specific render key; or, retrieve a stored default render key. The sub-steps for creating a client-specific render key (not shown) include discovering the client capabilities and setting the render key to maximize client use of those capabilities for display and use of the requested primary content.

Once the render key is obtained, the server uses the render key to generate the file having at least one hidden markup attribute, at step 605. The created file is then transmitted to the client at step 607. Once the created file has been received at the client browser, the browser will use its render key for decoding the hidden markup attributes to determine how to handle and display the contents of the communication. It is to be noted that legacy browsers (i.e., browsers which are "not aware" of the hidden markup attribute and render key technology) will see the hidden markup attributes as unused glyphs and will readily ignore them, so that content is not altered. New "aware" browsers will detect the hidden markup attributes, apply the render key for decoding the hidden markup attributes and then handle the content accordingly. It may be desirable to add a user notification step to the rendering process whereby a user is provided with a displayed message, via the browser GUI, asking for the user's permission to temporarily modify the font (or other subsystem) setup in order to display the requested data. Once a user inputs approval, the browser would proceed.

For general use, hidden markup attributes can provide invisible unicode (see: www.unicode.com) to any user who requests information from a web site. The web server will send both the render key and the file containing the primary content plus the hidden markup attributes for the invisible unicode. No user authentication would be required for such a general usage, whereby recipients of the file and render key would be enabled to display otherwise undisplayable data.

Sample ways in which the hidden markup attributes can be implemented at the client using the render key for display of primary content include altering the font properties; altering or replacing certain rendering subsystems; updating configuration information for the client's operating system; automatically modifying the client's operating system codepage; updating or exchanging a JVM font; or, providing a new JVM font required to view the data. Beyond their use for facilitating display of primary content, however, the hidden markup attributes can be used to in a variety of ways to instruct the browser on handling content which is provided in addition to the primary content. For example, hidden markup attributes can instruct a browser to hide sensitive data which is included in the file from some users.

FIG. 7 provides a graphical representation 700 of the display for a web-based banking service as displayed to different users. For an ordinary user, such as a employer depositing salary into an employee/account owner's account, the displayed account information, shown at 701, will only show the account owner's name and deposit information. The Account Balance field will be empty. However, for a designated "superuser" of that web-based banking service, such as a bank employee or the account owner, the display, shown at 703, will include a dollar figure for the Account Balance. While the bank server may have transmitted the same primary content information to each client site, the different hidden markup attributes which accompany the transmissions will dictate different display treatment for the different client users.

In addition to being capable of hiding sensitive data from some users, the hidden markup attributes can also be utilized to instruct client browsers to hide certain non-sensitive data, which need not be displayed to the user but should be communicated to and used by the browser. For example, hidden markup attributes can be used for the following:

setting whether or not a link is active providing highlights for creating book indexes providing link markers for bookmarks depicting text color in a monochromatic display depicting font information (e.g., bold or italic) when the client font has incomplete glyphs indicating information to follow, to be used by specific HTML readers for special needs such as "Bitmap is to follow", "Pushed button is below" or "Un-pushed button is below"

providing information about text to follow such as the security level of links (read only, archive, etc.).

Figure 8:
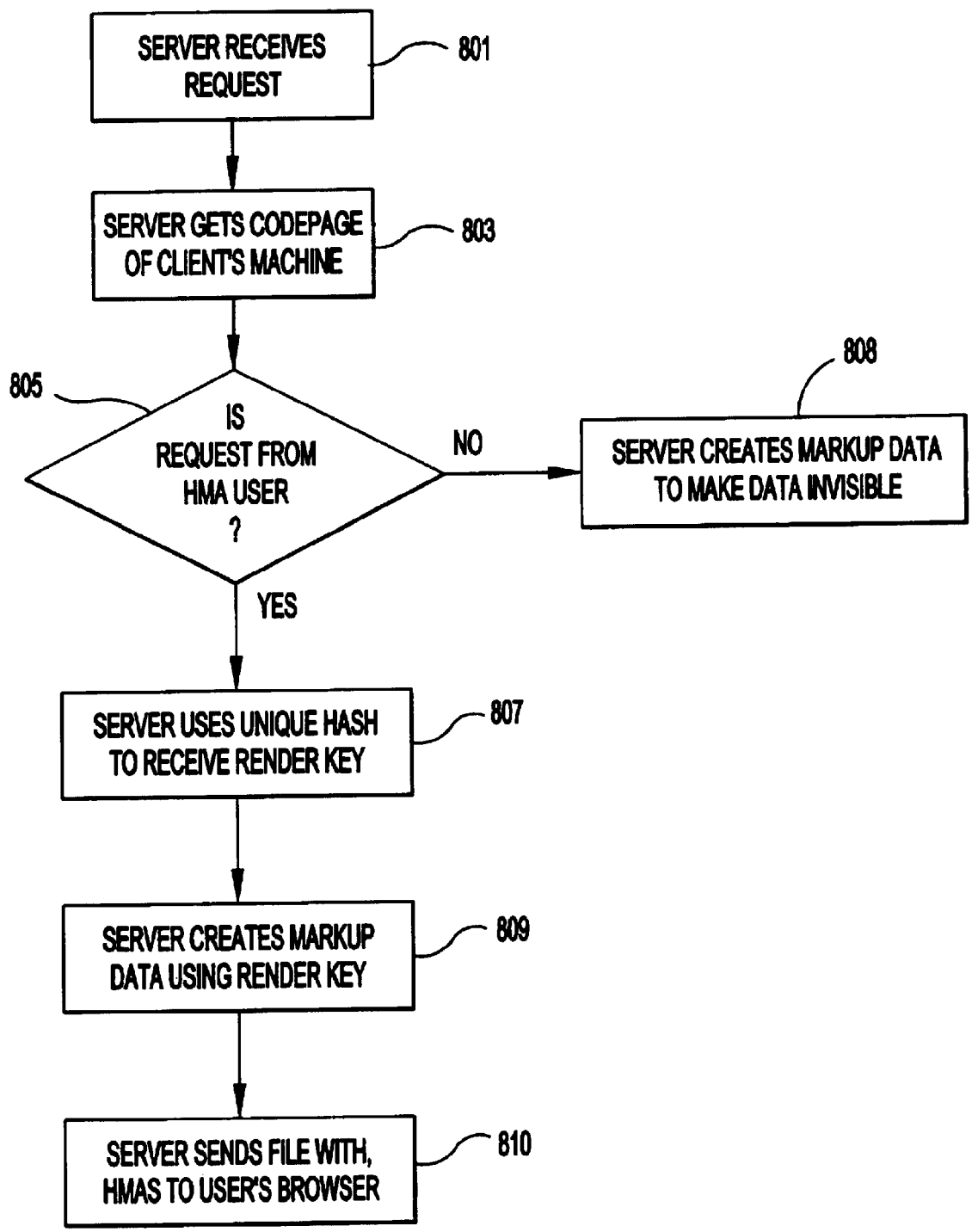
FIG. 8 provides a sample process flow for more rapidly processing requests in accordance with the present invention.

As had been mentioned above, the render keys may be quite extensive, making the provision of a render key within a request impractical. One solution is to create a user's unique hash number which is created at the server and is stored both at the server and at the client location (e.g., with the user's JVM) As depicted in FIG. 8, when a client request is received at the server, at step 801, the server gets the codepage from the client's machine where the browser is running, at step 803 to perform authentication. At decision box 805, the sever determines whether the request is from an authorized hidden markup attribute user. The determination may be made by gathering information from the browser to obtain the hash ID, followed by comparing the hash ID supplied by the browser to the list of stored hash IDs for authorized hidden markup attribute users. If it is determined at 805 that the user is an authorized hidden markup attribute user, the server uses the unique hash ID to retrieve the render key at 807. The server then uses the render key to create a markup file with at least one hidden markup attribute, at step 809, for use by the browser to decode the at least one hidden markup attribute using the render key. The server then sends the file with the content and the at least one hidden markup attribute to the client at 810. If the user is not determined to be an authorized hidden markup attribute user, at step 805, the sever creates a file using the browser codepage to ensure that all hidden markup attribute characters are invisible at the client's browser.

The latter process flow is particularly useful for a traveling user who may access the server from different client machines. Because only the hash ID is provided with each request, the server will necessarily look to the browser codepage. As a result, the server will recognize when the user is making a request from a machine with different capabilities and will encode the file appropriately.

Under the present invention, therefore, hidden markup attributes can be used to communicate rendering and other additional information to a client location. While the invention has been described with reference to several specific embodiments, one having skill in the relevant art will recognize that modifications may be made without departing from the spirit and scope of the invention as set forth in the appended claims.

Having thus described our invention, what we claim as new and desire to secure by Letters Patent is:

1. A server computing location for providing additional content with requested web content in response to a client request comprising:

at least one storage location for storing primary server content;

a server render processor for dynamically rendering the requested data in response to the client request, wherein said requested data is rendered in a file comprising primary server content and at least one hidden markup language attribute based on a client render key associated with the client request; and a transmitter component for sending said file to said client.

2. The server of claim 1 wherein said storage location additionally stores at least one render key comprising code for allowing a client browser to handle file content.

3. The server of claim 2 wherein said storage location additionally stores a default render key.

4. The server of claim 1 further comprising a render decoding component for determining a client render key based on said client request.

5. The server of claim 1 further comprising an authentication component for authenticating that the requesting client is authorized to access said at least one hidden markup attribute.

6. The server of claim 1 further comprising a render key creator component for creating a client render key based on input received from the client machine.

7. A system for providing enhanced communications from server location to a client location issuing a client request for data in a distributed computing network comprising:

at least one server storage location for storing primary server content;

a server render processor for dynamically rendering the requested data in response to a client request, wherein said data is rendered in a file comprising primary server content and at least one hidden markup language attribute based on a client render key associated with said client request;

a server transmitter component for sending said file to said client; and a client browser component for decoding the at least one hidden markup language attribute based on the client render key and for handling the primary server content and the attribute content based on said decoding.

8. The system of claim 7 wherein said client location additionally comprises a client render key creator component for creating said client render key.

9. The system of claim 8 wherein said client location further comprises means for communicating the client render key to the server location.

10. A method for providing additional content with requested web content delivered from a server to a client having a browser in response to a client request comprising the steps of:

receiving a client request at said server;

dynamically rendering the requested data in response to said client request, wherein said data is rendered in a file comprising primary server content and at least one hidden markup language attribute based on a client render key associated with said client request; and sending said file from the server to said client.

11. The method of claim 10 further comprising storing at least one render key comprising code for allowing a client browser to handle said file.

12. The method of claim 10 further comprising storing a default render key comprising code for allowing a client browser to handle said file.

13. The method of claim 10 further comprising determining a client render key based on said Client request.

14. The method of claim 10 further comprising creating a client render key based on input from a user at said client machine.

15. The method of claim 10 further comprising authenticating that the requesting client is authorized to access said at least one hidden markup attribute.

16. The method of claim 10 further comprising the steps of:

receiving said file at said client browser;

decoding said at least one hidden markup attribute using said client render key; and handling file content based on the results of said decoding.

17. The method of claim 16 wherein said results of said decoding comprise browser rendering information and wherein said handling file content comprises rendering said primary content using said browser rendering information.

18. The method of claim 17 wherein said browser rendering information comprises client subsystem update information and wherein said method further comprises updating at least one client subsystem to render said file Content.

19. The method of claim 16 wherein said handling of file content comprises selectively displaying content based on said results of said decoding.

20. A program storage device readable by machine, tangibly embodying a program of instructions executable by the machine to perform method steps for providing additional content with requested web content delivered from a server to a client having a browser in response to a client request, said method comprising the steps of:

receiving a client request at said server;

dynamically rendering the requested data in response to said client requests wherein said data is rendered in a file comprising primary server content and at least one hidden markup language attribute based on a client render key associated with said client request; and sending said file from the server to said client.

* * * * *